United States Patent
Jamzadeh

[19]

[11] Patent Number: 5,620,386
[45] Date of Patent: Apr. 15, 1997

[54] PARKING BRAKE FOR A POWER TRANSMISSION

[75] Inventor: Fereydoon Jamzadeh, Indianapolis, Ind.

[73] Assignee: General Motors Corporation, Detroit, Mich.

[21] Appl. No.: 552,762

[22] Filed: Nov. 3, 1995

[51] Int. Cl.⁶ ............................................ F16H 1/46
[52] U.S. Cl. ......................... 475/140; 475/116; 192/4 A
[58] Field of Search ................................ 475/116, 140; 192/4 A; 180/271

[56] References Cited

U.S. PATENT DOCUMENTS

| | | | |
|---|---|---|---|
| 4,049,096 | 9/1977 | Barth | 192/4 A |
| 4,195,716 | 4/1980 | Wirt | 192/4 A X |
| 5,029,682 | 7/1991 | Maurer et al. | 475/28 X |
| 5,052,532 | 10/1991 | Plate | 192/4 A |
| 5,111,921 | 5/1992 | Marks et al. | 192/4 A |
| 5,119,912 | 6/1992 | Martin | 192/4 A |
| 5,180,038 | 1/1993 | Arnold et al. | 192/4 A X |
| 5,197,355 | 5/1993 | Sherman et al. | 475/116 X |
| 5,351,570 | 10/1994 | Mizunuma et al. | 475/123 X |
| 5,460,578 | 10/1995 | Giuriati et al. | 192/4 A X |
| 5,526,909 | 6/1996 | Ohkawa | 192/4 A |
| 5,536,220 | 7/1996 | Martin | 475/275 |

*Primary Examiner*—Charles A. Marmor
*Assistant Examiner*—Peter Kwon
*Attorney, Agent, or Firm*—Donald F. Scherer

[57] ABSTRACT

An automatic shifting power transmission has at least two selectively engageable devices which provide distinct gear ratios when engaged during normal operation. These devices are pressure released and mechanically engaged by springs to establish tie-up in the transmission when the hydraulic pressure is not present. This tie-up provides a parking condition in the transmission by preventing rotation of the transmission output member.

3 Claims, 4 Drawing Sheets

5,620,386

PARKING BRAKE FOR A POWER TRANSMISSION

TECHNICAL FIELD

This invention relates to parking brake mechanisms in power transmissions.

BACKGROUND OF THE INVENTION

Many power transmissions have parking brakes incorporated in the transmission housing. These parking brakes generally take the form of a pivotally mounted on the housing and a toothed member rotatable with the transmission output member. The "Park" condition is achieved when the pawl meshes with the toothed member to restrain rotation of the output member. These devices are generally manually engaged, however, automatic engaging parking pawls have been considered.

SUMMARY OF THE INVENTION

It is an object of the present invention to provide an improved parking brake mechanism for a power transmission.

In one aspect of this invention two ratio establishing friction devices are mechanically engaged to establish a nonrotatable condition in the transmission powertrain. These two ratio establishing friction devices are engaged during normal transmission operation to establish distinct ratios such as the first forward ratio and the second forward ratio.

DESCRIPTION OF AN EXEMPLARY EMBODIMENT

Figure 1:
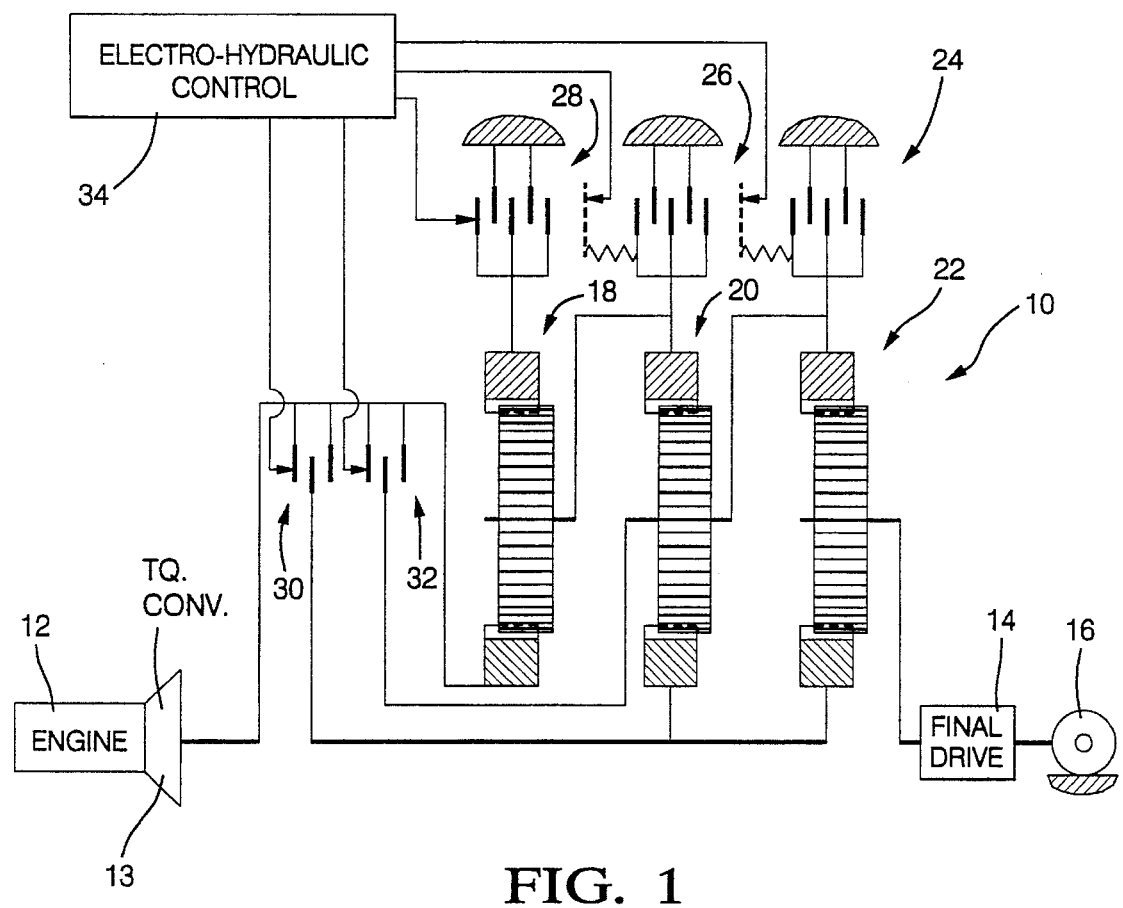
FIG. 1 is a schematic representation of a gear arrangement incorporating the present invention.

In FIG. 1, there is seen a power transmission generally designated 10 which provides multiple ratios between an engine 12 and a final drive 14. The final drive 14 is drivingly connected with the output drive member of the vehicle such as wheels 16.

The power transmission 10 incorporates three planetary gear sets 18, 20 and 22 which are effectively controlled in six forward ratios by three brake members 24, 26 and 28 and two selectively engageable clutches 30 and 32.

The brakes 24 and 26 are spring applied, that is, mechanically applied and pressure released. The brake 28 is selectively pressure applied and spring released as are the clutches 30 and 32. These are conventional friction devices and their assembly and use is well known within the art.

The engagement of brake 24 and clutch 30 will produce the first and lowest drive ratio between the engine 12, torque converter 13 and the final drive 14. The second forward speed ratio is provided by the clutch 30 and brake 26. The third speed is provided by the engagement of clutch 30 and the brake 28. The fourth forward speed is provided by the clutches 30 and 32 which all of the brakes 24, 26 and 28 are disengaged. The fifth forward speed is provided by the clutch 32 and the brake 28 and the sixth forward speed is provided by the clutch 32 and the brake 26. A reverse ratio is provided by the brakes 28 and 24. During reverse ratio, the input drive from the engine 12 and torque converter 13 is via the sun gear of the planetary set 18 which is continuously driven by the transmission input.

The brakes 24 and 26, as mentioned above, are mechanically or spring applied and hydraulically released. While the remaining friction devices are selectively fluid pressure applied and spring or mechanically released. The apply and release of these friction devices is under the control of a conventional electro-hydraulic control 34 which utilizes a number of inputs from various vehicle driving conditions to determine the desired drive ratio.

Figure 2:
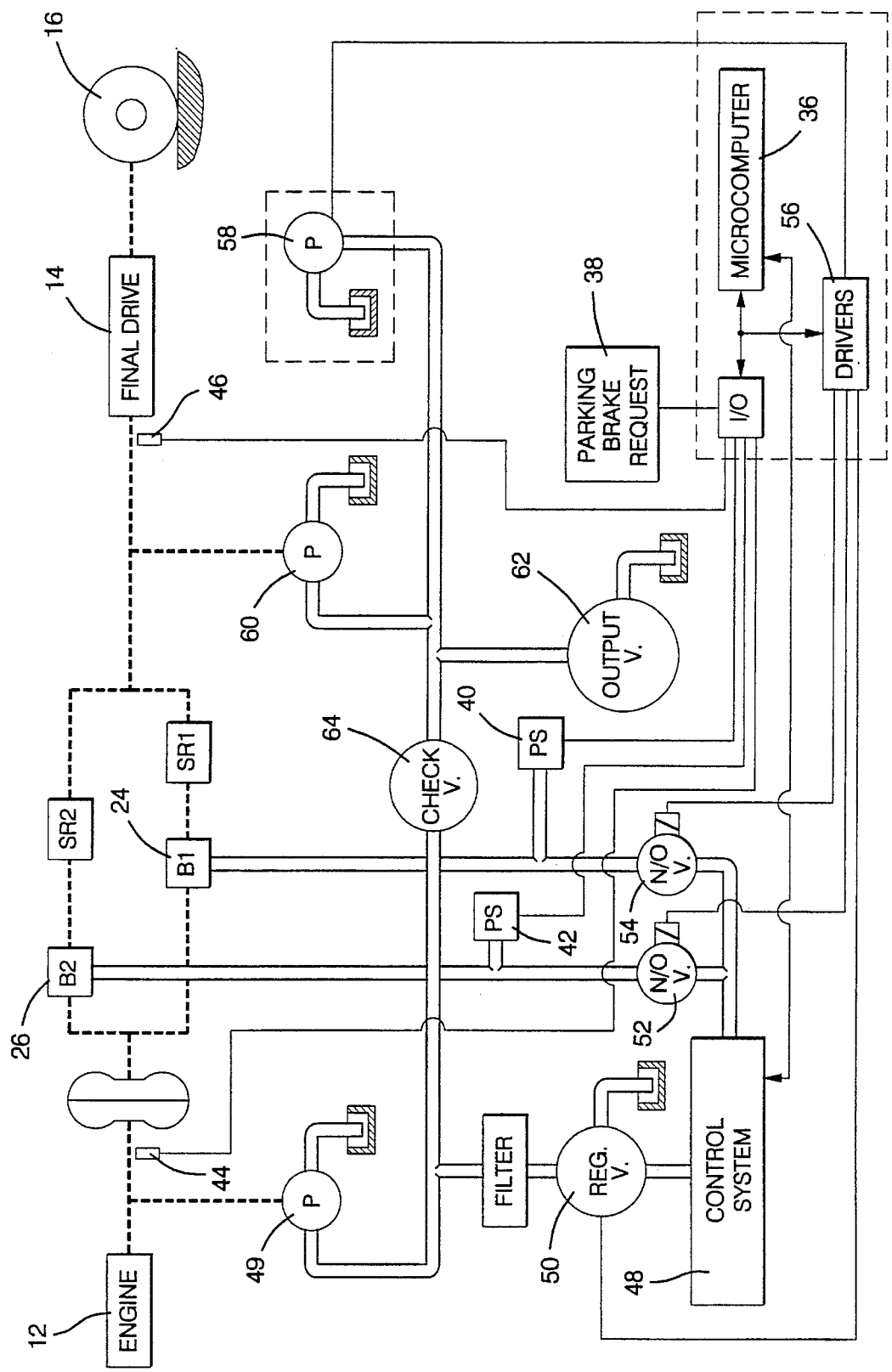
FIG. 2 is a diagrammatic representation of an electro-hydraulic control for a transmission incorporating the present invention.

The electro-hydraulic control is shown somewhat partially in FIG. 2 and, as can be seen, includes a micro computer or central processing unit 36 which receives input signals from a parking brake request mechanism 38, a pair of pressure switches 40 and 42, an input speed sensor 44 and an output speed sensor 46. The micro computer 36 also provides a signal for the control of the main system pressure 48. This pressure is established by a conventional positive displacement pump 49 and a regulator valve 50. The regulator valve, as well as two normally open solenoid valves 52 and 54, receive electrical signals from electronic drivers 56 which in turn are controlled by the micro computer 36. The drivers 56 also control the signal for the operation of an electrically driven pump 58.

The hydraulic control system also includes an output driven pump 60 which is operatively driven by the final drive 14 or the output shaft of the transmission 10 and the pressure output thereof is controlled by an output valve 62. Fluid generated by the pump 60 is delivered to the hydraulic system through a check valve 64 when the vehicle reaches a predetermined output speed such that the input velocity of the pump's impeller is sufficient to provide fluid.

The input pump 49 is continually driven whenever the engine is operating and therefore, during normal operation, provides controlled pressure via the regulator valve 50 to the main control system 48. The output driven pump 60 will also provide fluid pressure to the main control system 48 when required. In the event that the pumps 49 and 60 should not provide sufficient oil to maintain the system at the desired pressure, the electrically driven pump 58 can be energized to also supply fluid to the main control system 48. Thus, the main control system can be supplied with fluid pressure from any or all of the three pumps.

The normally open valve 54 is connected to provide fluid to the brake 24 and the normally open valve 52 is connected to provide fluid pressure to the brake 26. The other clutches and brakes are connected to fluid pressure via the main control system 48 also. These main clutches and brakes are generally controlled in engagement and disengagement by conventional relay or shift valves, the operation of which is well known.

With the present invention, the brakes 24 and 26 will receive fluid pressure from the main system whenever the solenoid valves 54 and 52 are not energized. Thus, on initial startup, for example, the brakes 24 and 26 will be disengaged when the engine begins running. However, when the engine is stopped and no fluid pressure is supplied by any of the pumps 49, 60 or 58, the brakes 24 and 26 will be spring applied and therefore both engaged. The micro computer 36 is aware of the pressure condition at each brake 24 and 26 by the state of the pressure switches 40 and 42, respectively.

As will be appreciated by reviewing the planetary arrangement of FIG. 1, it will be noted that the simultaneous application or engagement of brakes 24 and 26 will cause the transmission output and therefore final drive 14 to be restrained from rotation. Thus, the simultaneous engagement of these friction devices will provide a parking condition for the transmission.

The gearing arrangement shown in FIG. 1 is substantially the same as that shown in U.S. Pat. No. 4,070,927 issued to Polak on Jan. 31, 1978, and assigned to the assignee of this application. For a more detailed description of the operation of the transmission, the Polak patent should be reviewed.

While the gearing shown in FIG. 1 is that of a planetary arrangement, the present invention is also useful with countershaft type transmissions which utilize fluid operated and spring released clutches. Such a device is shown in U.S. Pat. No. 5,009,116 issued to Ordo et al. on Apr. 23, 1991, and assigned to the assignee of this application. Transmissions such as those shown in Ordo can be operated with spring engaged or mechanically engaged clutches in at least two of the ratios while the remaining ratios are pressure engaged and spring released. The concepts of control shown in FIG. 2 will be equally operable for such countershaft type transmissions.

To control operation of the transmission shown in FIG. 1, when the engine is started and the pump 49 is rotating sufficiently to produce system pressure, the normally open valves 54 and 52 direct fluid pressure to the brakes 24 and 26 to ensure their disengagement. If the operator selects the forward drive condition, the micro computer 36 will issue a command to the drivers 56 to actuate or energize the valve 54 thereby preventing fluid pressure from reaching the brake 24 resulting in the mechanically applied condition of the brake. The micro computer 36 will also issue a command to the control system 48 resulting in engagement of the clutch 30. Under this condition, the transmission will be operating in the first or lowest gear ratio.

To establish the second forward gear ratio, the micro computer 36 will issue a command to energize the solenoid valve 54 while de-energizing the solenoid valve 52 thus resulting in disengagement of the brake 24 and the engagement of the brake 26. The clutch 30 will remain engaged.

Those skilled in the art will readily appreciate that the micro computer 36 is useful when controlling the engagement and disengagement of the remaining friction devices to establish the six forward speed ratios and the one reverse ratio, as well as the neutral condition.

When the vehicle is brought to a halt and the engine operation is discontinued, the pressurization of brakes 24 and 26 will also discontinue thereby causing the mechanical application of the brakes such that the output member of the transmission will be restrained from rotating thereby placing the vehicle in the park condition. It is also desirable to obtain a park condition when the engine is running, and this can be attained through the actuation of the park brake request 38. This element can take the form of a simple off/on switch or button which when operated by the driver will supply a signal to the micro computer 36 requesting that the valves 52 and 54 be energized.

Figure 3:
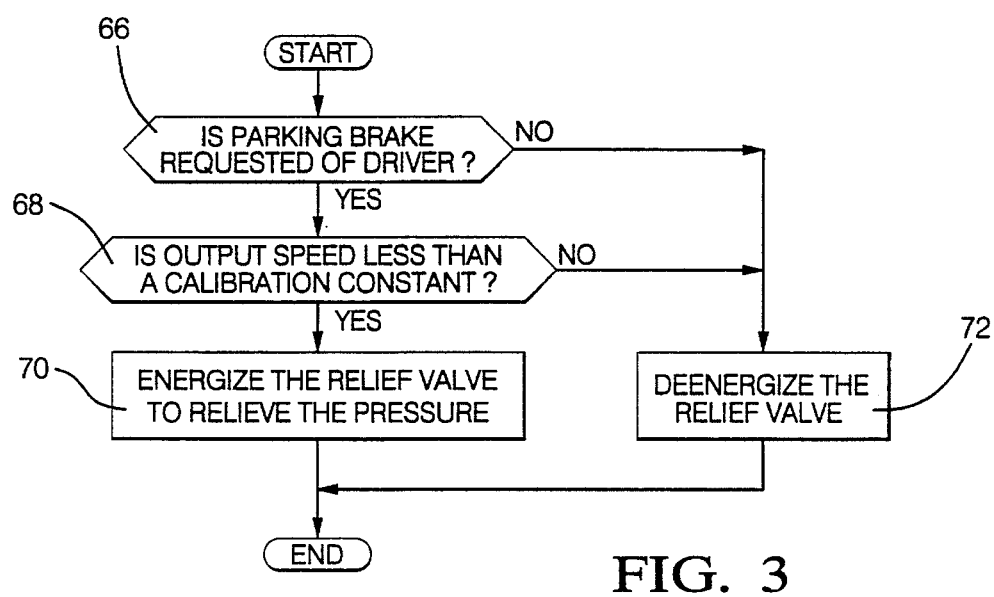
FIG. 3 is an algorithm for determining if an operator input is present.

The vehicle operation will be analyzed by the micro computer 36 prior to the signal being advanced to the valves 52 and 54. As seen in FIG. 3, for example, the micro processor will determine at step 66 if a parking brake signal is requested by the operator. If so, the computer will determine at step 68 if the output speed is less than a desirable value as determined by the speed sensor 46. If so, the micro processor 36 will issue the command at step 70 to the relief valve 50 to prevent fluid pressure from being generated within the system. If desired by the particular control system, commands can be sent to the valves 54 and 52 to energize the valves thereby preventing fluid pressure from reaching the brakes 24 and 26 while the remainder of the system can still be provided with fluid pressure. Thus the parking brake can be energized with or without engine operation.

Figure 4:
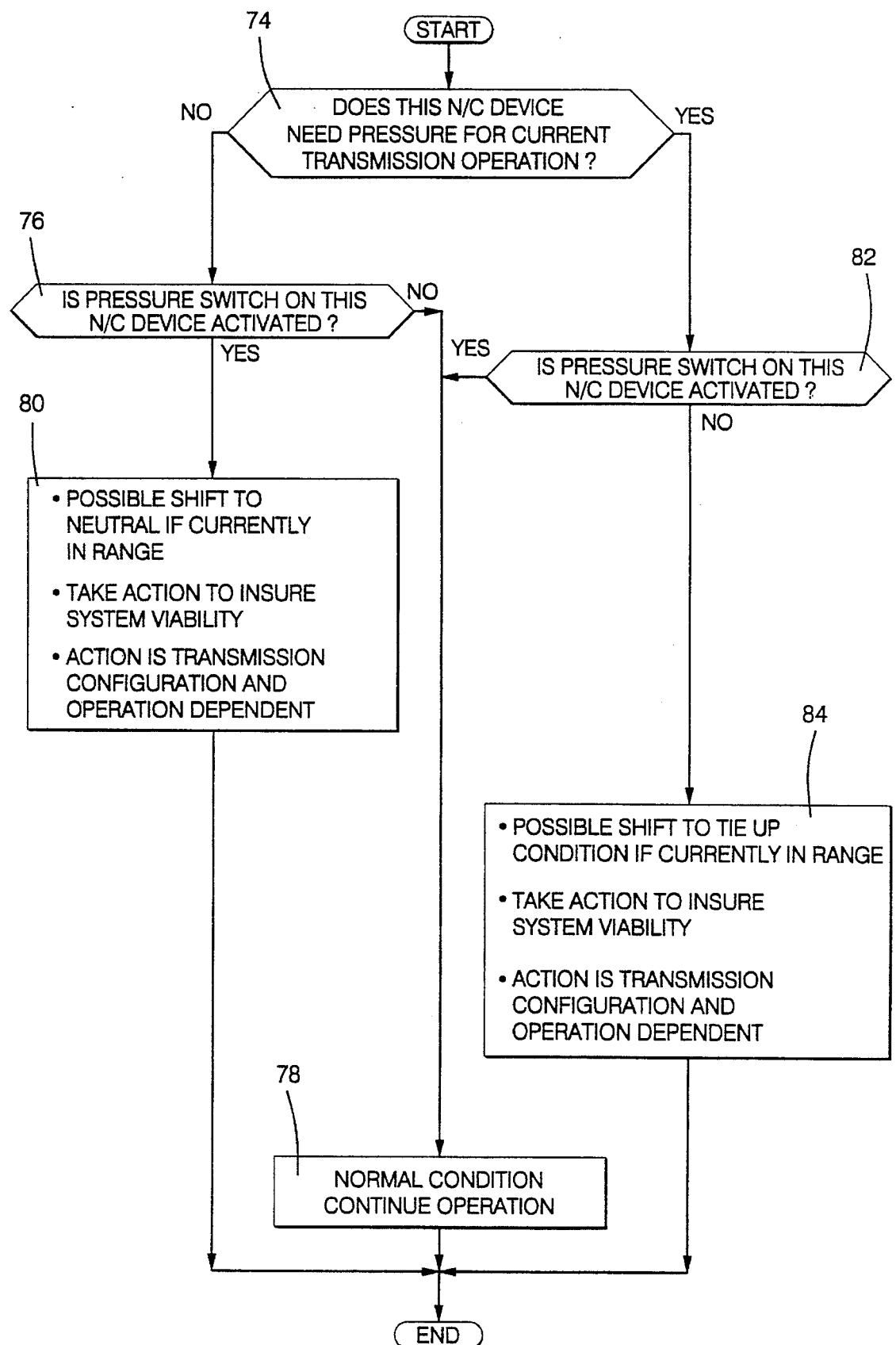
FIG. 4 is an algorithm for determining if the proper operation is occurring.

In FIG. 4, an algorithm relating to the spring applied pressure released friction devices 24 and 26 is set forth. With this algorithm the micro computer 36 determines at step 74 if the spring engaged device needs fluid pressure for the current transmission ratio. In other words, is the transmission operating in a gear ratio such as third wherein both of the devices 24 and 26 should be disengaged or in the first or second ratio wherein one of the devices should be engaged and the other disengaged.

Under this condition, the micro computer 36 determines which gear operation has occurred and whether or not the devices 24 and 26 should be disengaged. If pressure is not needed at either of the devices for this operation, the micro processor determines at step 76 if the pressure switch (40 or 42) for that particular device is activated. If the pressure switch is not activated for that particular device, the transmission operation continues in the normal mode as determined at step 78 by the micro processor. If the pressure switch is activated, suggesting that pressure has been developed at friction device, the micro computer 36 will determine at step 80 which is the best possible manner to ensure the system's viability. Quite often, the best solution will be a shift to neutral if the transmission is in one of the drive ranges.

Another solution will be accepted if a high speed ratio can be attained, for example, if first or second operation was supposed to be available but did not become available because of fluid pressure operating in that particular brake, the transmission might upshift to third or fourth and remain in that gear until the problem is solved.

Likewise, when the micro processor 36 determines at step 82 that pressure should be available during the current operation, that is, when the transmission is not operating in first or second or sixth, that the pressure should be available at the brakes 24 and 26, and the pressure switch associated with the particular brake is pressurized, then normal operation is continued. If, however, the required pressure switch is not activated suggesting that pressure is not available at that friction device and therefore the device is engaged, the micro processor 36 determines at step 84 the best solution to ensure viability of the transmission system.

Among the possible solutions are to find another range which can be utilized or to shift to neutral which is also a viable option. In any event, the micro processor is conditioned to accept the existence of the inordinate condition and determine the best possible solution to ensure system viability.

Figure 5:
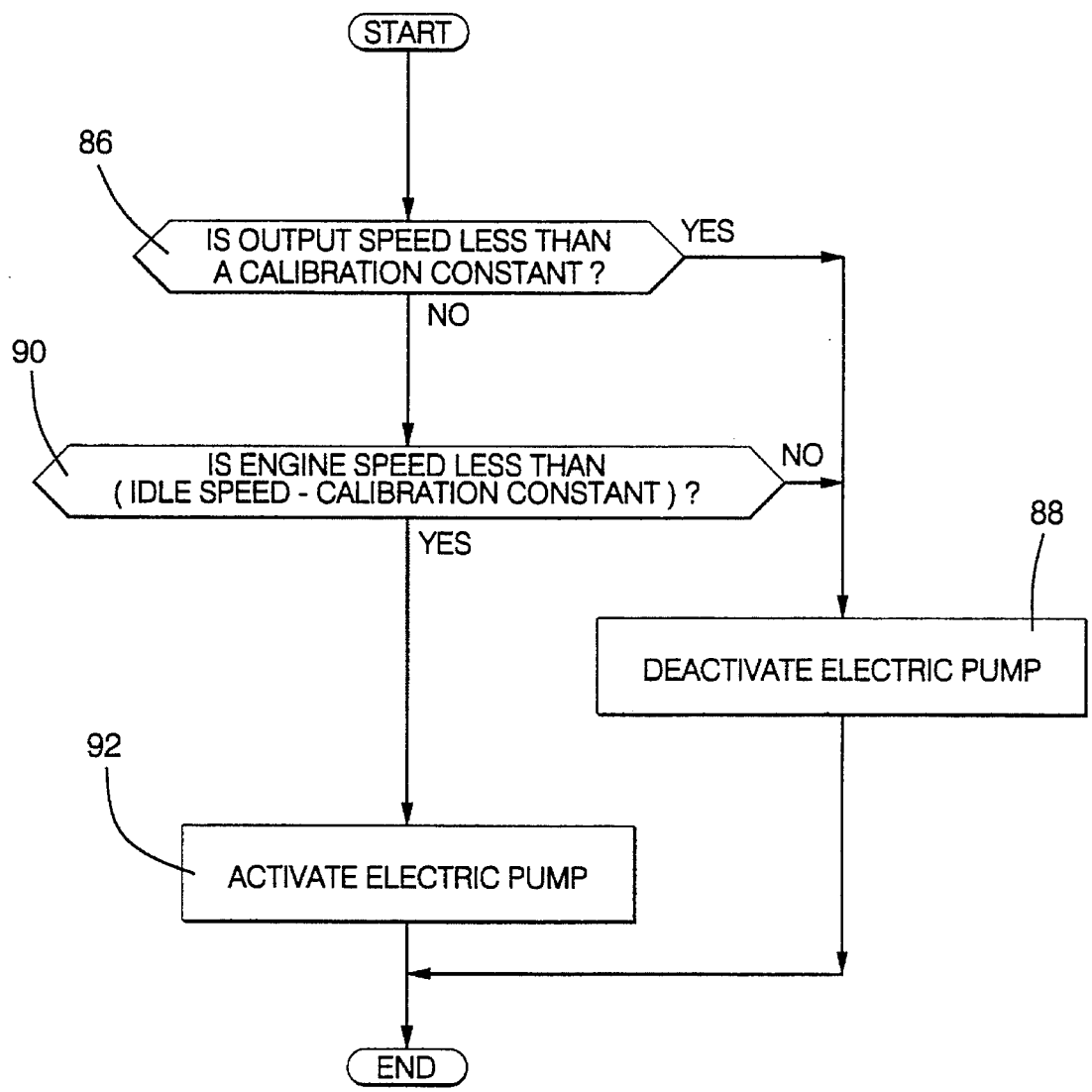
FIG. 5 is an algorithm for determining if an auxiliary pressure source is required.

FIG. 5 discloses an algorithm which is designed to ensure that pressure is available. In this algorithm, the micro processor determines at step 86 if the output speed is below a predetermined value as suggested or input by speed sensor 46. If the output speed is determined at step 86 to be correct, that is below a predetermined value suggesting that the vettitle should be coming to rest, the electric pump 58 is not activated at step 88. However, should the output speed be above that predetermined value, the micro processor determines at step 90 if the engine speed is less than the idle condition. Again, if the engine speed is greater than idle, thereby suggesting the system pressure from pump 49 will be sufficient, the electric pump 58 is not activated at step 88.

However, if the engine speed is less than idle at step 90, suggesting that the engine is not operating while the output speed is suggesting that vehicle operation is desired, the micro computer 36 at step 92 will activate the electric pump thereby ensuring that sufficient fluid pressure will be available to maintain the viability of the system.

In view of the above description, those skilled in the art will appreciate that the present invention will provide a parking condition, that is, a nonrotatable output condition in the transmission when the vehicle is stopped and the engine is inoperative or the vehicle is stopped and the vehicle has requested that the park condition be engaged.

I claim:

1. A park mechanism in a transmission having an input shaft and an output shaft comprising:

first and second torque establishing mechanisms each having a plurality of mechanically engaged friction members for respectively establishing first and second distinct drive ratios in a transmission, and a hydraulically actuated member for selectively preventing establishment of the respective ratios;

an electro-hydraulic control system for selectively supplying hydraulic fluid to said hydraulically actuated members; and said first and second torque establishing mechanisms being simultaneously engaged when hydraulic fluid is not supplied thereto for establishing a park condition in said transmission to inhibit rotation of the output shaft.

2. The park mechanism defined in claim 1 wherein the transmission has a plurality of selectively established drive ratios including a first and lowest ratio, a second and next lowest ratio and wherein the first and second torque establishing mechanisms are engaged for the first and second ratios respectively.

3. The park mechanism defined in claim 1 wherein the first and second torque establishing mechanisms are spring applied, pressure released brakes.

* * * * *